United States Patent
Cheng et al.

(10) Patent No.: US 11,759,858 B2
(45) Date of Patent: Sep. 19, 2023

(54) METAL OBJECT AND MANUFACTURING METHOD THEREOF HAVING SOLID LUBRICATING SURFACE LAYER

(71) Applicant: METAL INDUSTRIES RESEARCH&DEVELOPMENT CENTRE, Kaohsiung (TW)

(72) Inventors: Tseng-Jen Cheng, Kaohsiung (TW); Kai-Han Chen, Kaohsiung (TW); Fu-Chuan Hsu, Kaohsiung (TW); Chih-Hao Lin, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 360 days.

(21) Appl. No.: 17/106,554

(22) Filed: Nov. 30, 2020

(65) Prior Publication Data

US 2021/0170482 A1  Jun. 10, 2021

(30) Foreign Application Priority Data

Dec. 6, 2019 (TW) ................................ 108144743

(51) Int. Cl.
| | |
|---|---|
| *B22F 3/16* | (2006.01) |
| *B22F 3/02* | (2006.01) |
| *B22F 10/00* | (2021.01) |
| *B22F 1/10* | (2022.01) |
| *B33Y 10/00* | (2015.01) |

(52) U.S. Cl.
CPC ................ *B22F 3/168* (2013.01); *B22F 1/10* (2022.01); *B22F 3/02* (2013.01); *B22F 10/00* (2021.01); *B22F 2003/023* (2013.01); *B22F 2301/205* (2013.01); *B33Y 10/00* (2014.12)

(58) Field of Classification Search
CPC .... B22F 3/168; B22F 1/10; B22F 3/02; B22F 10/00; B22F 2003/023; B22F 2301/205; B22F 2998/10; B33Y 10/00; B33Y 40/20; Y02P 10/25
See application file for complete search history.

(56) References Cited

U.S. PATENT DOCUMENTS

2019/0315630 A1* 10/2019 Hioki ..................... F16D 69/02

FOREIGN PATENT DOCUMENTS

| CN | 107130223 A | * | 9/2017 | ......... C23C 14/0605 |
|---|---|---|---|---|
| TW | I550210 | | 9/2016 | |
| TW | M582091 | | 8/2019 | |

* cited by examiner

*Primary Examiner* — Rebecca Janssen
(74) *Attorney, Agent, or Firm* — WPAT, PC

(57) ABSTRACT

A method for manufacturing a metal object having a solid lubricating surface layer includes: providing a metal blank having a surface; providing a plurality of microparticles and solid lubricating powder, and mixing them together, wherein the microparticles have a hardness greater than that of the surface; and projecting the microparticles and the solid lubricating powder onto the surface, wherein the microparticles cause plastic flow on the surface to form a compressive stress layer, and the solid lubricating powder adheres to the compressive stress layer to form a solid lubricating surface layer.

6 Claims, 4 Drawing Sheets

METAL OBJECT AND MANUFACTURING METHOD THEREOF HAVING SOLID LUBRICATING SURFACE LAYER

CROSS-REFERENCE TO RELATED APPLICATION

This application claims the benefit of Taiwan Patent Application No. 108144743, filed on Dec. 6, 2019, which is hereby incorporated by reference for all purposes as if fully set forth herein.

BACKGROUND

Technical Field

The present disclosure relates to a metal object and a manufacturing method thereof having a solid lubricating surface layer, and in particular, to a metal object and a manufacturing method thereof having improved mechanical properties of the metal object and simultaneously forming with a solid lubricating surface layer.

Related Art

Powder metallurgy (PM) and metal powder 3D printing have been widely used in the manufacture of industrial components because of various advantages, for example, high material utilization, ability of forming complex components and low power consumption. However, the metal components manufactured by using PM or 3D printing, such as gears, have microvoids on their surface layers, and are prone to metal fatigue failures or brittle fractures because of loads, thereby posing threats to the normal operation of a system or even endangering personal safety.

The transmission element may cause power consumption and heat generation due to friction during operation. There are three conventional methods for decreasing the friction on a surface of a sliding element, including: (1) surface grinding and polishing, (2) lubricating liquids, and (3) low friction coefficient coating. However, with the trend of precision and miniaturization of products and the needs of green manufacturing, the mechanical surface grinding, polishing and conventional coating technology cannot meet the demanding needs, and the use of the lubricating liquids is prone to causing environmental issues.

The patent document (TW patent No. M582091) discloses a solid lubricating chain. The solid lubricating chain disclosed in the patent document mainly has an internal surface and an external surface of each of the linings coated with solid lubricating layers. By using the solid lubricating layers effectively adhered to the internal surfaces and the external surfaces of the linings, not only the frictional resistance is decreased, but also the abrasion caused by the friction between shafts, rollers and the linings is slowed down, thereby obtaining a better lubricating effect, and improving the smoothness of transmission. In this patent document, the solid lubricating layers formed on the internal surface and the external surface of each lining by a coating method, can decrease the frictional resistance, however, under the action of forces between the shafts, the rollers and the linings, the solid lubricating layers are prone to falling off because of poor adhesion.

The patent document (TW patent No. 1550210) discloses a method for manufacturing a pin shaft of a chain, including: mixing raw material powder with a solid lubricant, coating them on a peripheral surface of the pin body, and then sintering them to form a lubricating layer having the solid lubricant. In this patent document, by using the sintering process, the raw material powder and the solid lubricant are fixed to the peripheral surface of the pin body, thereby solving the problem of the poor adhesion of the lubricating layer formed by coating method. However, the use of the sintering process increases process time and cost.

Therefore, there is a need to provide a metal object and a manufacturing method thereof having a solid lubricating surface layer to resolve the foregoing problems.

SUMMARY

An object of the present disclosure is to provide a metal object and a manufacturing method thereof having a solid lubricating surface layer, capable of improving both the mechanical properties and the tribological properties of the metal object.

In order to achieve the foregoing objective, the present disclosure provides a method for manufacturing a metal object having a solid lubricating surface layer, comprising the following steps of: providing a metal blank having a surface; providing a plurality of microparticles and solid lubricating powder, and mixing them together, wherein the plurality of microparticles have a hardness greater than that of the surface; and projecting the plurality of microparticles and the solid lubricating powder onto the surface, wherein the plurality of microparticles cause plastic flow on the surface to form a compressive stress layer, and the solid lubricating powder adheres to the compressive stress layer to form a solid lubricating surface layer.

The present disclosure further provides a metal object having a lubricating surface layer, comprising: a metal substrate comprising a compressive stress layer and a solid lubricating surface layer adhered to the compressive stress layer.

A plurality of microparticles and solid lubricating powder are projected onto a surface of a metal blank of the present disclosure. The microparticles cause plastic flow of a material, forming a denser compressive stress layer to improve the mechanical properties. While the material is plastically flowing, the solid lubricating powder adheres to the compressive stress layer, so as to have a better adhesion compared with the lubricating surface layer formed by conventional spraying or coating methods, and a thinner lubricating surface layer can be obtained.

DETAILED DESCRIPTION

Figure 1:
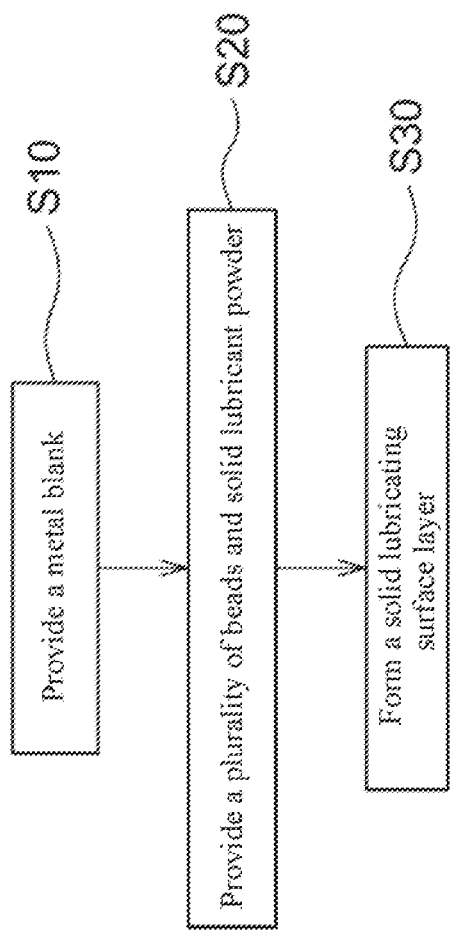
FIG. 1 is a flowchart of a method for manufacturing a metal object having a solid lubricating surface layer according to a preferred embodiment of the present disclosure.
Figure 2:
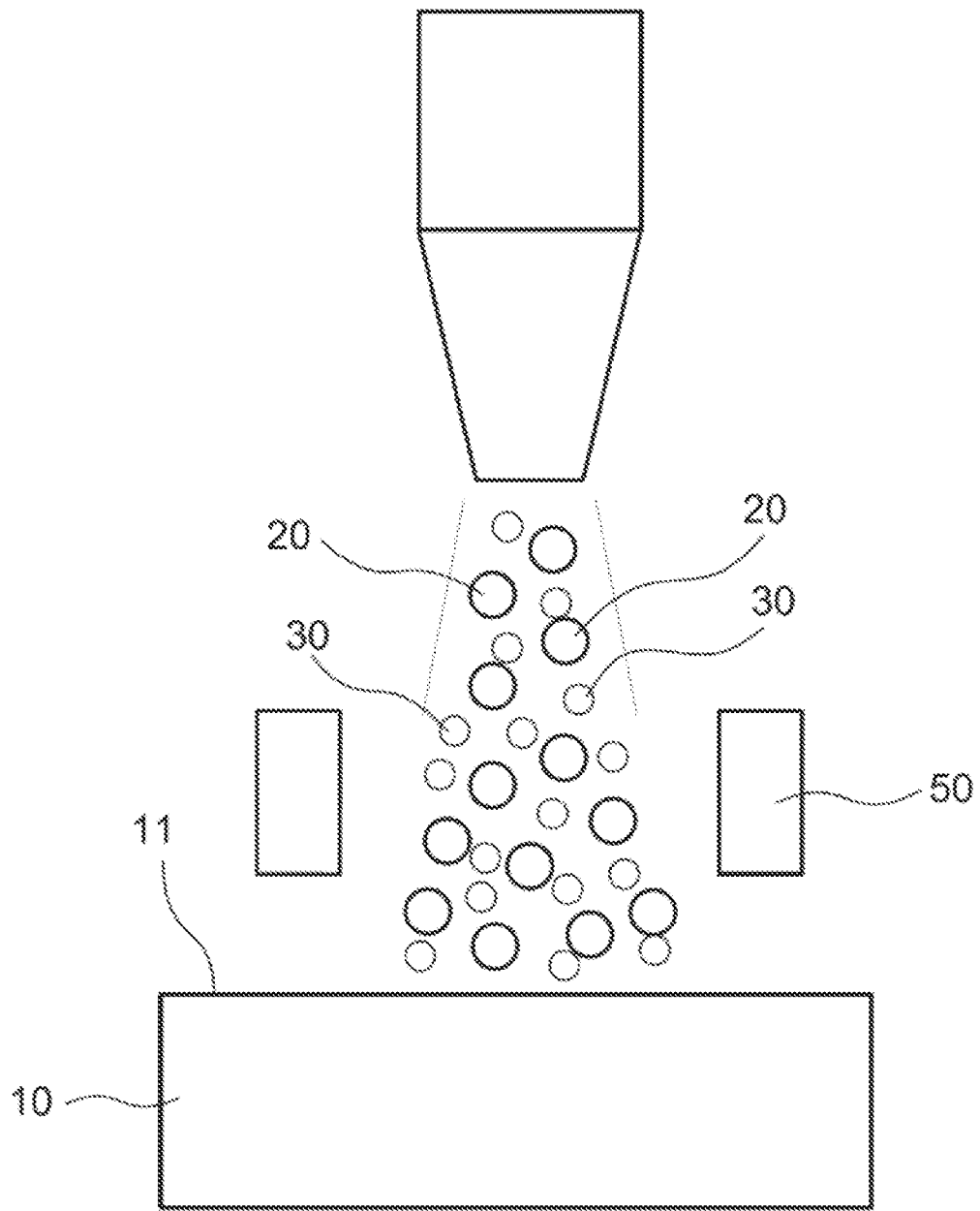
FIG. 2 is a schematic diagram of the operation of forming a solid lubricating surface layer according to the present disclosure.
Figure 3:
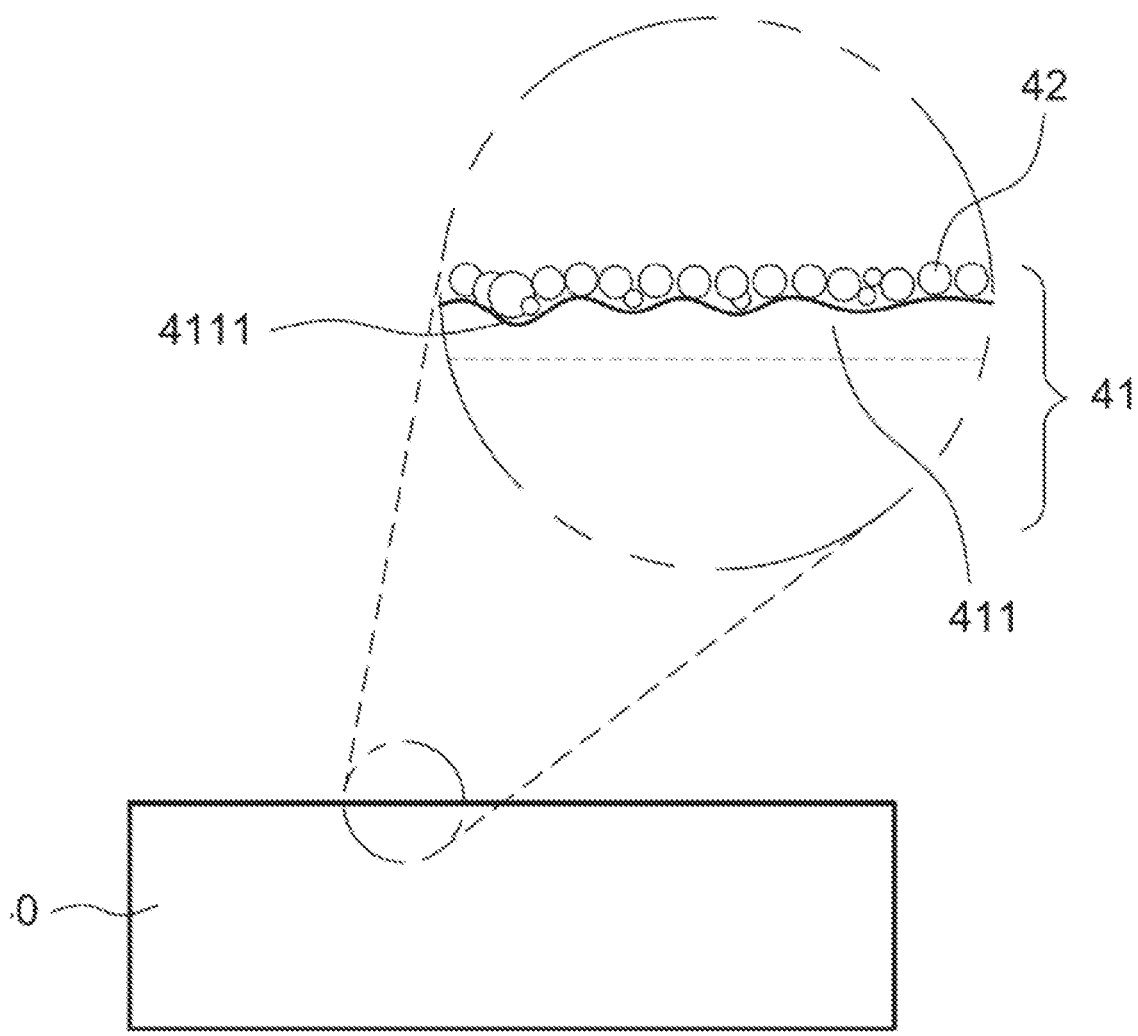
FIG. 3 is a schematic cross-sectional view of a metal object having a solid lubricating surface layer according to the present disclosure.

To make the foregoing or other objects, features, and characteristics of the present disclosure more comprehensibly, the related embodiments of the disclosure are described in detail below with reference to the accompanying drawings:

FIG. 1 is a flowchart of a method for manufacturing a metal object having a solid lubricating surface layer according to a preferred embodiment of the present disclosure, FIG. 2 is a schematic diagram of the operation of forming a solid lubricating surface layer, and FIG. 3 is a schematic cross-sectional view of a metal object having a solid lubricating surface layer according to the present disclosure. Referring to FIG. 1, FIG. 2 and FIG. 3, the method for manufacturing a metal object having a solid lubricating surface layer according to a preferred embodiment of the present disclosure includes the steps as follows:

A step of providing a metal blank (S10): a metal blank 10, having a surface 11 is provided.

A step of providing a plurality of microparticles and solid lubricating powder (S20): a plurality of microparticles 20 and solid lubricating powder 30 is provided, and they are mixed together, wherein the plurality of microparticles 20 have a hardness greater than that of the surface 11.

A step of forming a solid lubricating surface layer (S30): the plurality of microparticles 20 and the solid lubricating powder 30 are projected onto the surface 11, wherein the plurality of microparticles 20 cause plastic flow on the surface 11 to form a compressive stress layer 411, and the solid lubricating powder 30 adheres to the compressive stress layer 411 to form a solid lubricating surface layer 42, thereby forming a metal object 40 having the solid lubricating surface layer 42.

In the step of providing a metal blank (S10), the surface 11 of the metal blank 10 has processing features left during processing and forming, such as tool marks left during cutting, and pore marks left during powder metallurgy (PM), metal powder 3D printing or metal injection molding (MIM).

In the step of providing a plurality of microparticles and solid lubricating powder (S20), the material of the microparticles 20 can be selected to be a ceramic material, such as zirconia ($ZrO_2$). The material of the microparticles 20 can also be selected to be high-speed steel. To enable the surface 11 of the metal blank 10 to produce plastic deformation after the projection of the microparticles 20, the microparticles 20 have a hardness greater than that of the surface 11. The diameter of the microparticle 20 can be selected according to the needs of implementations, and is not limited.

In the step of providing a plurality of microparticles and solid lubricating powder (S20), the material of the solid lubricating powder 30 is selected from a group consisting of tungsten disulfide ($WS_2$), molybdenum disulfide ($MoS_2$), hexagonal boron nitride (h-BN) and graphite. The diameter of the solid lubricating powder 30 is preferably between 0.5 μm and 5 μm.

In the step of providing a plurality of microparticles and solid lubricating powder (S20), the plurality of microparticles 20 and the solid lubricating powder 30 are mixed uniformly after preparation. For example, the plurality of microparticles 20 and the solid lubricating powder 30 are placed in a mechanical mixer to be mixed.

In the step of forming a solid lubricating surface layer (S30), the plurality of microparticles 20 and the solid lubricating powder 30 can be projected onto the surface 11 at a high speed, for example, but not limited to, by providing a airflow (using siphon principle).

Figure 4:
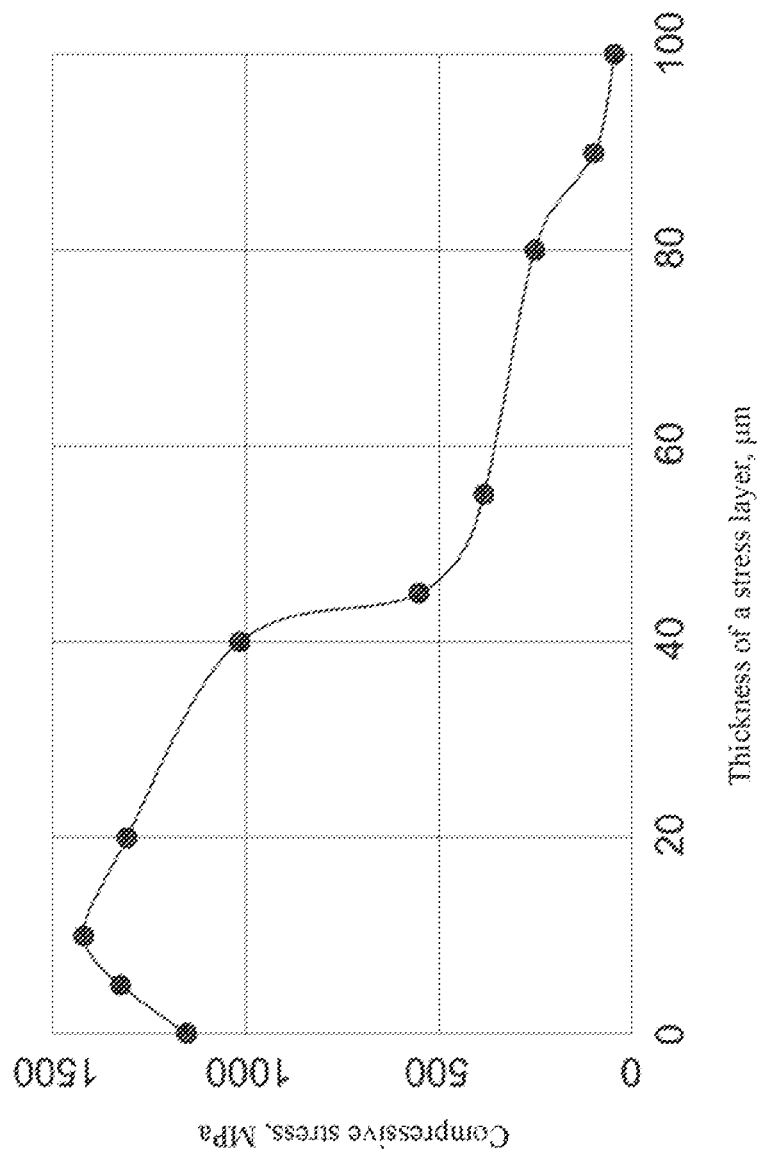
FIG. 4 shows a corresponding relationship between the thickness of a stress layer and the compressive stress of the metal substrate according to an embodiment of the present disclosure.

In the step of forming a solid lubricating surface layer (S30), when the plurality of microparticles 20 are projected onto the surface 11 of the metal blank 10, the surface 11 is subjected to the compressive stress of the plurality of microparticles 20 to generate plastic deformation and material flow, so that the metal blank 10 forms a metal substrate 41. The local region on the metal substrate 41 where the plastic deformation and the material flow are generated because of the compressive stress is a compressive stress layer 411, and the compressive stress layer 411 has a plurality of dimples 4111 formed by impacts of the plurality of microparticles 20. When the plastic deformation and the material flow are generated, the processing features (tool marks and pore marks) of the surface 11 left during processing and forming will be destroyed, and a denser surface layer (the compressive stress layer 411) will be formed, so as to improve the mechanical properties (such as elastic limit, yield strength, fatigue strength and hardness). Referring to FIG. 4, it shows the corresponding relationship between the thickness of the stress layer and the compressive stress of the metal substrate obtained in a specific embodiment. In this embodiment, the thickness of the compressive stress layer 411 is less than 100 μm, and when the thickness is less than 40 μm, the compressive stress layer 411 has a compressive stress between 1000 MPa and 1450 MPa.

In the step of forming a solid lubricating surface layer (S30), the solid lubricating powder 30 and the plurality of microparticles 20 are simultaneously projected onto the surface 11. When the surface 11 undergoes the plastic deformation and the material flow, the solid lubricating powder 30 is embedded in the plurality of dimples 4111 formed by the impacts of the plurality of microparticles 20 on the surface 11. In addition, when the plurality of microparticles 20 impact the surface 11, and the surface 11 is subjected to compressive stress to generate the plastic deformation and the material flow, a predetermined temperature (local high temperature) can be generated, facilitating the adherence of the solid lubricating powder 30 to the compressive stress layer 411. In an embodiment of the present disclosure, the solid lubricating surface layer 42 has a thickness between 0.1 μm and 1 μm.

It should be particularly noted that the solid lubricating powder 30 embedded in and adhered to the compressive stress layer 411 have an opportunity to be refined and/or embedded deeper by the following impacts of the microparticles 20, so that a solid lubricating surface layer 42 with a thin thickness and good adhesion may be obtained.

In the step of forming a solid lubricating surface layer (S30), a heating step can be further included. Before the plurality of microparticles 20 and the solid lubricating powder 30 are projected onto the surface 11, the plurality of microparticles 20 and the solid lubricating powder 30 are heated to increase the energy of the plurality of microparticles 20 and the solid lubricating powder 30. When the microparticles 20 impact the surface 11, the work-hardening effect of the compressive stress layer 411 is further strengthened. Meanwhile, the solid lubricating surface layer 42 can be formed more efficiently, and the adhesion of the solid lubricating surface layer 42 can be further improved. Preferably, the microparticles 20 are made of a Fe-based metal material. After heating, the temperature of the microparticles 20 should not be higher than their tempering temperature, to prevent them from softening after tempering. In an embodiment, a heating unit 50, such as a high-frequency heating unit, can be disposed outside the projection range of the plurality of microparticles 20 and the solid lubricating powder 30, to heat the plurality of microparticles 20 and the solid lubricating powder 30 passing through.

The present disclosure further discloses a metal object 40 having a solid lubricating surface layer 42, the metal object 40 includes a metal substrate 41 having a compressive stress layer 411 and a solid lubricating surface layer 42, and the solid lubricating surface layer 42 is adhered to the compressive stress layer 411. The material of the solid lubricating surface layer 42 is selected from a group consisting of $WS_2$, $MoS_2$, h-BN and graphite.

For example, a process of manufacturing a gear having a solid lubricating surface layer according to the method disclosed in the present disclosure is described as follows:

A step of providing a metal blank (S10), the metal blank 10 is a gear blank manufactured by using PM, the material thereof is a Fe-based metal, and the surface 11 is a tooth surface of the gear blank.

A step of providing a plurality of microparticles and solid lubricating powder (S20): the material of the microparticles 20 is selected is a zirconia ceramic material with a diameter between 10 μm and 30 μm, and the hardness of the microparticles 20 is 1100 HV to 1300 HV. The solid lubricating powder 30 selected is $WS_2$ having a diameter between 0.5 μm and 5 μm. After preparation, the plurality of microparticles 20 and the solid lubricating powder 30 are placed in a mechanical mixer to be mixed;

A step of forming a solid lubricating surface layer (S30): the plurality of microparticles 20 and the solid lubricating powder 30 are projected onto the tooth surface with a high-speed airflow by using the siphon principle. The tooth surface is subjected to the compressive stress of the plurality of microparticles 20 to generate plastic deformation and material flow, forming a metal substrate 41 having a compressive stress layer 411, and a plurality of dimples 4111 is formed on the compressive stress layer 411. Meanwhile, pore marks of the tooth surface left during the forming of the gear blank (PM forming) will be compressed to be flattened because of the material flow, forming a denser compressive stress layer 411. When the tooth surface undergoes the plastic deformation and the material flow, the solid lubricating powder 30 is embedded in a plurality of dimples 4111 on the compressive stress layer 411, and meanwhile, when the plurality of microparticles 20 impact the tooth surface and the tooth surface undergoes the plastic deformation and the material flow, a local high temperature can be generated, so that the solid lubricating powder 30 adheres to the compressive stress layer 411, forming a solid lubricating surface layer 42.

The gear having a solid lubricating surface layer manufactured in this embodiment includes a gear substrate (a metal substrate 41) having a compressive stress layer 411, a plurality of dimples 4111 are formed on the compressive stress layer 411, and a solid lubricating surface layer 42 adhered to the compressive stress layer 411. The compressive stress layer 411 has a thickness between 5 μm and 20 μm, and a stress at the thickness is between 1300 MPa and 1450 MPa. The plurality of dimples 4111 has a depth between 0.5 μm and 3 μm. The solid lubricating surface layer 42 is made of $WS_2$, and has a thickness between 0.1 μm and 1 μm.

The present disclosure has the following effects: 1. The processing features (tool marks and pore marks) on the surface of the metal blank left during processing and forming are destroyed because of the projection of the microparticles, forming a denser surface layer (i.e., the compressive stress layer), thereby contributing to the improvement of mechanical properties (such as elastic limit, yield strength, fatigue strength and hardness). 2. The solid lubricating powder is embedded and adhered to the compressive stress layer when the plastic deformation and the material flow are generated, thereby obtaining a better adhesion than the lubricating surface layer formed by conventional spraying or coating method, and a thinner lubricating surface layer can be obtained. 3. By using the present disclosure to simultaneously improve the mechanical properties and form the lubricating surface layer, the process costs and process time can be reduced.

In conclusion, the foregoing descriptions are merely the preferred implementations or embodiments of the technical means adopted by the present disclosure to resolve the problems, and is not intended to limit the scope of the patent implementation of the present disclosure. That is, all changes and modifications accordant with the scope of the claims of the present disclosure, or made according to the scope of the claims of the present disclosure shall fall within the scope of the present disclosure.

What is claimed is:

1. A method for manufacturing a metal object having a solid lubricating surface layer, comprising the following steps of:
   providing a metal blank having a surface;
   providing a plurality of microparticles and solid lubricating powder, and mixing them together, wherein the plurality of microparticles have a hardness greater than that of the surface; and
   projecting the plurality of microparticles and the solid lubricating powder onto the surface, wherein the plurality of microparticles cause plastic flow on the surface to form a compressive stress layer, and the solid lubricating powder adheres to the compressive stress layer to form a solid lubricating surface layer;
   wherein the plurality of microparticles is made of a zirconia ceramic material having a diameter between 10 μm and 30 μm, and the compressive stress layer has a thickness between 5 μm and 20 μm; and
   the solid lubricating surface layer is made of tungsten disulfide having a diameter between 0.5 μm and 5 μm, and the solid lubricating surface layer has a thickness between 0.1 μm and 1 μm.

2. The method for manufacturing a metal object having a solid lubricating surface layer according to claim 1, wherein the metal blank is manufactured by using powder metallurgy (PM) process, metal injection molding (MIM) process or metal powder 3D printing process.

3. The method for manufacturing a metal object having a solid lubricating surface layer according to claim 1, wherein the plurality of microparticles have a Vickers hardness between 1100 and 1300.

4. The method for manufacturing a metal object having a solid lubricating surface layer according to claim 1, wherein the plurality of microparticles impact the surface to cause the plastic flow, forming the compressive stress layer, so that the solid lubricating powder is embedded in the compressive stress layer.

5. The method for manufacturing a metal object having a solid lubricating surface layer according to claim 1, wherein the plurality of microparticles cause the plastic flow on the surface and generates a predetermined temperature, so that the solid lubricating powder adheres to the compressive stress layer.

6. The method for manufacturing a metal object having a solid lubricating surface layer according to claim 1, further comprising a heating step, for heating the plurality of microparticles and the solid lubricating powder, before projecting the plurality of microparticles and the solid lubricating powder onto the surface.

\* \* \* \* \*